H. PSENCIK.
PLOW.
APPLICATION FILED JULY 30, 1915.
1,172,046. Patented Feb. 15, 1916.
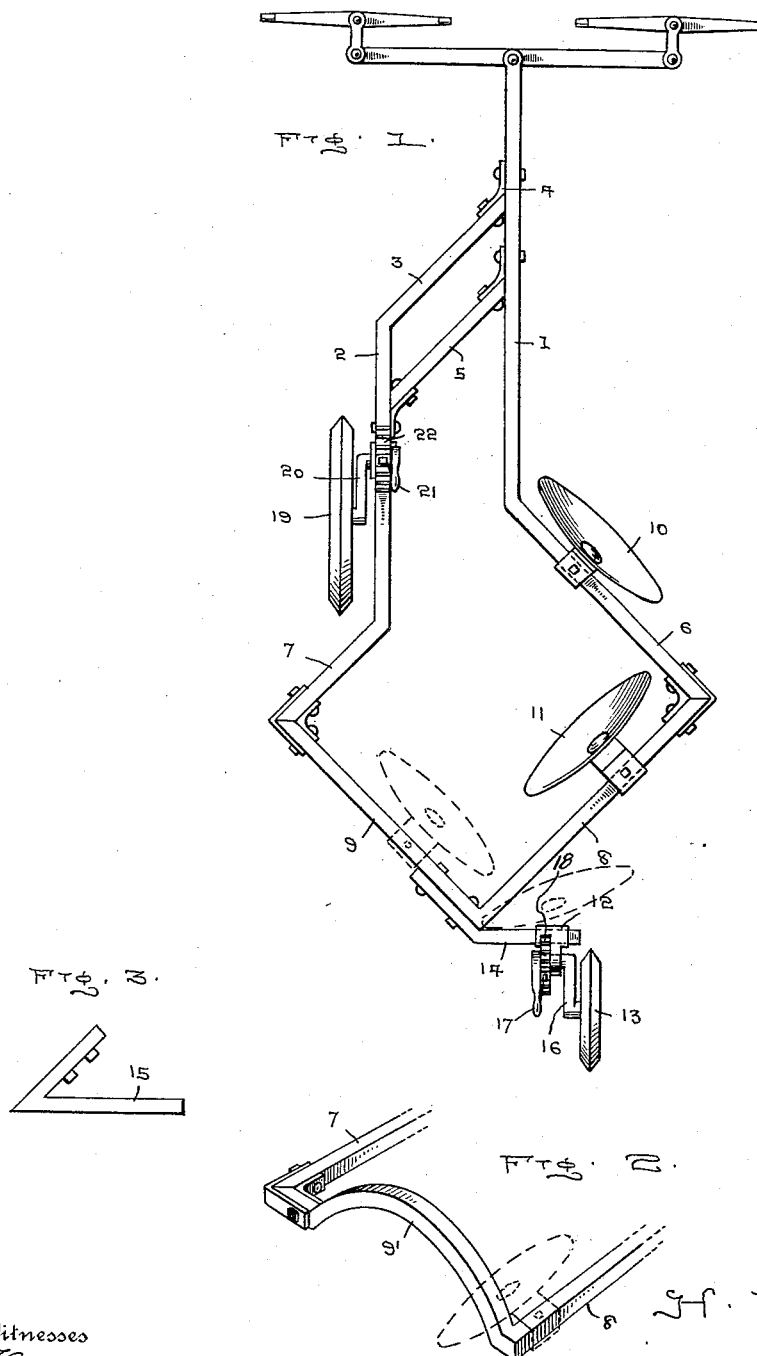
Witnesses
Thos W Riley
C. S. Frye
Inventor
H. Psencik
By W. T. FitzGerald
Attorney
THE COLUMBIA PLANOGRAPH CO., WASHINGTON, D. C.

UNITED STATES PATENT OFFICE.

HENRY PSENCIK, OF BALLINGER, TEXAS.

PLOW.

1,172,046.  Specification of Letters Patent.  Patented Feb. 15, 1916.

Application filed July 30, 1915. Serial No. 42,749.

*To all whom it may concern:*

Be it known that I, HENRY PSENCIK, a citizen of the United States, residing at Ballinger, in the county of Runnels and State of Texas, have invented certain new and useful Improvements in Plows; and I do hereby declare the following to be a full, clear, and exact description of the invention, such as will enable others skilled in the art to which it appertains to make and use the same.

My invention relates to new and useful improvements in plow construction and more particularly to disk plows, and my object is to provide a frame having various angles therein to which the disks are adjustably attached.

A further object is to so construct the device that a single disk can be used, or a number of disks. And a further object is to so construct the device that the disk may be arranged to throw the dirt in opposite direction or in the same direction.

Other objects and advantages will be hereinafter set forth and more particularly pointed out in the accompanying specification.

In the accompanying drawings which are made a part of this application, Figure 1 is a top plan view of a plow showing a pair of disks attached thereto. Fig. 2 is a detail perspective view of a modified form of frame for the plow, and Fig. 3 is a plan view of one form of arm employed for carrying the rear supporting wheel.

Referring to the drawings in which similar reference numerals designate corresponding parts throughout the several views, 1 indicates the main beam section and 2 the auxiliary beam section, the forward end 3 of which is extended inwardly and forwardly, and secured to the main beam 1 adjacent its forward end by means of a clip 4, said beams being reinforced by means of a brace 5 in the rear of the end section 3.

The rear end portion 6 of the beam 1 is extended outwardly at an angle, while the rear end 7 of the beam 2 is likewise extended outwardly at an angle and so positioned that the longitudinal axis of said end 7 will intersect the point of union between the main beam section 1 and the end portion 6. To the free ends of the end sections 6 and 7 are attached arms 8 and 9 respectively of the rear portion of the frame, said arms being preferably constructed integral and at right angles to each other and forming a substantially angular structure.

When the arms 8 and 9 are attached to the ends 6 and 7, they form a substantially square structure and the end portions and arms are at an angle to the beam 1 and auxiliary beam 2 of substantially 45°.

The end portion 6 and arms 8 and 9 are adapted to receive cutting disks 10 and 11, which are preferably adjustably mounted on said sections for purposes to be hereinafter set forth. As shown in the drawings, the disk 10 is positioned adjacent the forward end of the end section 6 and the disk 11 is positioned on the arm 8 in such position as to overlap the disk 10 and leave a clean furrow, the disk 11 being arranged to throw the soil in the opposite direction from the disk 10.

If it is desired to increase the width of the furrow the disk 10 can be moved rearwardly on the end section 6 and the disk 11 likewise moved rearwardly away from the disk 10 so that a ridge will be left between the two disks, and to remove the ridge an additional disk is to be attached to the shank 12 employed for carrying the rear supporting wheel 13, as shown by dotted lines in Fig. 1, said shank being adjustably mounted on an arm 14, which arm is in turn secured to the arm 9. If proper adjustment can not be had with the arm 14 to properly position the disk carried by the shank 12, an additional arm 15 is to be substituted for the arm 14 and attached to the arm 8 so as to properly position the shank 12 to cause the disk carried thereby to remove the ridge left between the two main disks.

If it is desired to throw the soil all in one direction, the disk 11 may be removed from the arm 8 and engaged with the arm 9 as shown by dotted lines Fig. 1 and the disk 10 so positioned on the end 6 and the disk 11 so positioned on the arm 9 that the soil loosened by the disk 11 will be thrown into the furrow made by the disk 10, thereby using the plow for breaking purposes.

When the disk 11 is positioned on the arm 8 adjacent the arm 9 that form of arm shown in Fig. 2 is preferably used, the arm 9' having a bowed portion so that the soil will readily pass below said arm without coming in contact therewith. This will also give a greater adjustment to the disk 11.

The supporting wheel 13 is preferably carried upon a crank arm 16 and is swung to various positions through the medium of a lever 17 which has the usual form of latch thereon coöperating with a rack 10 to hold the crank arm in its adjusted position. An additional supporting wheel 19 is carried by the auxiliary beam 2 through the medium of a crank arm 20 which crank arm is likewise controlled through the medium of a lever 21 and rack bar 22 and by adjusting the crank arms 16 and 20, the disks may be positioned to cut at various depths.

It will thus be seen that I have provided a plow structure which may be used for breaking the soil or for making furrows or trenches. It will likewise be seen that by adjustably attaching the various disks in the manner shown, the amount of soil loosened may be increased or decreased as may be required. And it will likewise be seen that in view of the simplicity of the device, it can be very cheaply constructed and at the same time made strong and durable.

Having thus fully described my invention what I claim as new and desire to secure by Letters Patent, is:

A plow structure comprising a main beam having an outwardly extending rear end, an auxiliary beam having an outwardly extending rear end, integral arms at right angles to each other, means to attach the arms to the outwardly extending ends to form a substantially square structure at the rear ends of the beams, each element of the square structure extending at an angle of substantially 45° from the main beam, and a plurality of disks adjustably attached to said square structure.

In testimony whereof I have signed my name to this specification in the presence of two subscribing witnesses.

HENRY PSENCIK.

Witnesses:
W. A. HALAMICEK,
WALTER MIKESKA.

Copies of this patent may be obtained for five cents each, by addressing the "Commissioner of Patents, Washington, D. C."